United States Patent [19]
Cantwell

[11] Patent Number: 4,476,735
[45] Date of Patent: Oct. 16, 1984

[54] POSITIONING APPARATUS

[76] Inventor: Gill Cantwell, 2434 Purdue Ave. #17, Los Angeles, Calif. 90064

[21] Appl. No.: 431,480

[22] Filed: Sep. 30, 1982

[51] Int. Cl.³ .............. F16H 33/10; F16H 27/00; F16H 29/00; B23B 29/24
[52] U.S. Cl. ................................. 74/84 R; 74/112; 74/122; 74/817
[58] Field of Search ............... 74/63, 84 R, 112, 640, 74/89, 804, 805, 122, 817, 827, 813 C

[56] References Cited

U.S. PATENT DOCUMENTS

| | | | |
|---|---|---|---|
| 1,449,352 | 3/1923 | Seeck | 74/63 |
| 1,738,662 | 12/1929 | Morison | 74/63 |
| 2,049,122 | 7/1936 | Kuba | 74/63 |
| 3,283,597 | 11/1966 | Doll | 74/63 |
| 3,468,175 | 9/1969 | Rabek | 74/63 |
| 3,507,159 | 4/1970 | Batty | 74/63 |

FOREIGN PATENT DOCUMENTS

| | | | |
|---|---|---|---|
| 341053 | 9/1921 | Fed. Rep. of Germany | 74/63 |
| 682790 | 10/1939 | Fed. Rep. of Germany | 74/112 |
| 523568 | 4/1921 | France | 74/63 |

*Primary Examiner*—Lawrence J. Staab
*Assistant Examiner*—Michael J. Gonet
*Attorney, Agent, or Firm*—Nilsson, Robbins, Dalgarn, Berliner, Carson & Wurst

[57] ABSTRACT

A first member defines a plurality of depressions such as V-shaped notches therein and is positioned so that the V-shaped notches are adjacent another plurality of similar notches defined by a second member. The spacing of the recesses in the second member is different than the spacing of recesses in the first member. A movable ball is received in each of the recesses of the first member. A cam is positioned to alternately force one of the balls into engagement between partially aligned recesses on the first and second members forcing relative movement between the members, positioning a load connected thereto.

16 Claims, 5 Drawing Figures

POSITIONING APPARATUS

FIELD OF THE INVENTION

This invention relates to apparatus for positioning machine elements, and more particularly for positioning these elements at discrete, incremental locations.

BACKGROUND OF THE INVENTION

Many applications require incremental positioning of movable machine elements. Among these are magnetic transducers on magnetic disc and drum drives; optical transducers on optical disc drives; platens and pen carriages on incremental plotters; magentic transducers on multi-track, moving head, magnetic tape drives; platens, platen carriages, print head carriages, print wheels, print thimbles, print balls, and print drums on computer output printers, word processors, teletypes, and typewriters; wafer steppers; and numerically controlled machine tools.

Ideal positioning of these machine elements requires minimal overshoot, minimal oscillation, and minimal dead band. If the power input to the positioning apparatus is of an analog nature, then the apparatus should convert that input into a specific incremental output. If the power input is of an incremental nature, then the positioning apparatus should refine that incremental input into precise positional increments.

DESCRIPTION OF THE PRIOR ART

One prior art apparatus is a rotary positioner used to drive both axes of a drum type incremental plotter. The input to this positioner is incremental in nature, and consists of flux changes generated in a set of three electromagnetic coils. Three pointed flexures are alternately engaged with a toothed wheel responsive to energizing the coils. Although this device produces superior positioning results, the heavy driven masses require substantial input power, the collisions with the toothed wheel generate substantial noise, and the device is expensive to manufacture.

Another class of devices is similar in appearance, but fundamentally different in operation and consists of a nutating gear motor or a gear motor using a spur gear idler engaging two side by side ring gears of slightly different diameters. The spur gear imparts a one or two tooth advancement of the movable ring gear for each cycle of the idler. These machines are simply analog reducing devices and do not impart any improvement in incremental positioning to the analog or digital inputs that drive them.

SUMMARY OF THE INVENTION

Fixed and driven members are positioned adjacent each other with each defining surfaces thereon to receive force imparted by a driving member disposed adjacent thereto. Means is provided for moving the driving member into simultaneous engagement with surfaces on the fixed and driven member causing the driven member to move as necessary to achieve a predetermined position in response thereto.

Through the positioning apparatus of the present invention there is provided an apparatus which may be inexpensively fabricated by molding processes which can provide precise incremental output from either incremental or analog input and which has low inertia, minimum noise, no dead band or oscillation and requires minimum power for operation.

DETAILED DESCRIPTION

Various devices, as above indicated require precise positioning in discrete movements for various purposes. The present invention includes a structure for connection to such devices to accomplish the required discrete steps resulting in the incremental positioning needed. The apparatus of the present invention may take various configurations and may be actuated by different input mechanisms. For purposes of simplicity of illustration and description, a positioning apparatus configured in a circle and an additional one configured in a straight line have been chosen. Those skilled in the art will recognize that other driving members (such as rods) may be used and that other force receiving surfaces (such as ramps) may be used without departing from the spirit or scope of the present invention.

Figure 1:
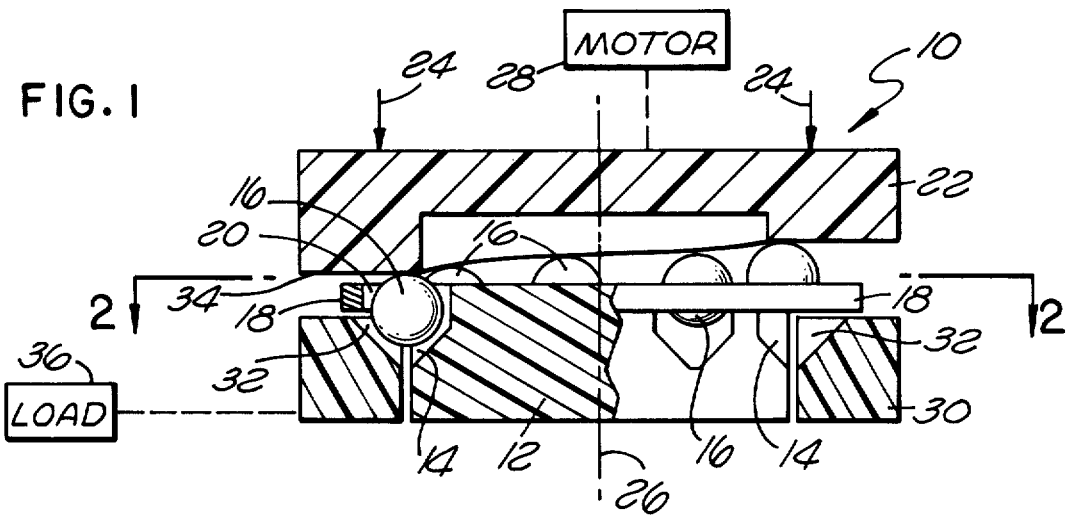
FIG. 1 is a cross sectional view illustrating one form of an apparatus embodying the presention invention.
Figure 2:
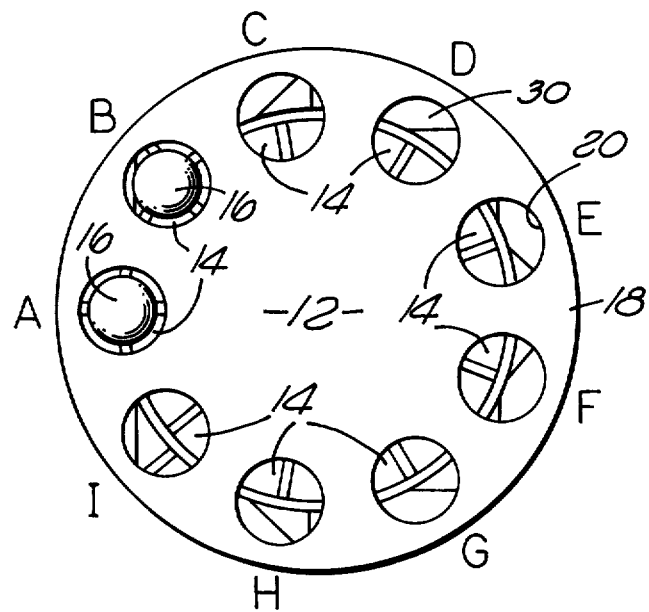
FIG. 2 is a view of the structure of FIG. 1 taken about the lines 2—2 thereof.

FIGS. 1 and 2 illustrate in schematic form a positioning apparatus constructed in accordance with the present invention formed in a circular configuration. In principle, the structure includes a series of pockets each formed of two halves relatively movable with respect to each other. Only two of the opposed pocket halves are aligned at any one time. A driving member such as a ball is positioned to be fully seated only within the aligned halves at any point in time. By sequentially forcing the driving member into each of the pockets, incremental positioning of one of the members defining a pocket half with respect to the other defining pocket half is accomplished.

Referring now more specifically to the FIGURES, FIG. 1 illustrates the positioning apparatus 10 generally and as is therein shown it includes a fixed member or element 12 having nine force receiving surfaces in the form of V-shaped notches 14, equally spaced about its periphery at 40° intervals. Each of the notches 14 contains a driving member in the form of a spherical ball 16 positioned therein. The member 12 has an outwardly extending flange 18 which defines a series of openings 20, each formed integrally with a notch 14 within which the balls 16 are loosely retained. A one lobe face cam 22 is loaded axially against the balls 16 as illustrated by the arrows 24 and is rotated about its axis 26 by a power input means such as a motor 28.

A driven element or member 30 is also rotatably mounted about the axis 26 and also defines a plurality of force receiving surfaces in the form of V-shaped notches 32. In the embodiment illustrated in FIG. 1 the driven element 30 defines eight V-shaped notches 32 equally spaced around its periphery at 45° intervals. As the cam 22 rotates the lobe 34 thereon sequentially depresses each of the balls 16 and as a result thereof the V-shaped eight notches 32 are forced alternately to align with the nine V-shaped notches 14. As a result of the angular difference in spacing between the notches appearing on the fixed member and the movable member and in this configuration there being one less notch on the movable member, for each 40 degrees of rotation of the cam 22, the driven member 30 rotates 5 degrees in the opposite direction.

By reference to FIG. 2, a clearer understanding of the invention may be had. In FIG. 2, cam 22 has been deleted as has motor 28 and only two of the balls 16 are shown in position. It will be understood that a ball 16 will be placed in each of the additional openings 20 appearing in the flange 18. As can be seen more clearly in FIG. 2, the fixed member 12 includes each of the notches 14 aligned with the opening 20 in the flange 18 so that the respective ball 16 is positioned thereover. As the movable member 30 contains one less notch only one of the notches on the member 30 will be aligned with one of the notches on the member 12 at any specific point in time. This alignment occurs as a result of the cam lobe 34 forcing a ball 16 downwardly (as viewed in FIG. 1) into the notches. Each of the nine positions in FIG. 2 has been lettered A through I. As is noted, the ball 16 at station A has been forced downwardly by the cam lobe 34 as shown in FIG. 1, thus aligning the V-notches so that a complete receiving pocket of opposed aligned V-notches is formed. By reference to station B it will be noted that the V-notch in the movable member 30 is slightly offset in a clockwise direction from the V-notch 14 in the fixed member 12. As the cam rotates in a clockwise direction, force against ball 16 at station A is relieved, while force against ball 16 at station B is increased. As the force is thus increased the ball 16 in station B is forced downwardly, thus causing the moving member 30 to move in a counterclockwise direction to totally align the notches on the moving and fixed members at station B. Such operation will continue as the cam continues to rotate. Such rotational movement of the cam is imparted to a load 36 which may be affixed to the moving member 30 by any means desired.

Although the apparatus as shown in FIGS. 1 and 2 illustrate only a single ball being forced into a pair of aligned notches at a time, it will be understood that the structure may be configured in such a manner that two or three or more pair of notches may be aligned simultaneously. Under these circumstances an equal number of balls would be simultaneously forced into these aligned notches by an equal number of lobes on the face cam. Such a configuration would increase the contact area between the balls and the notches and would balance the forces acting on the face cam and on the movable member.

It will also be recognized that although the structure shown in FIGS. 1 and 2 is configured in such a manner that there are a fewer number of notches on the movable member than on the fixed member, that such can be reversed. In such a situation the movable member would move in the same direction as the face cam is rotating as opposed to in the opposite direction. It will also be recognized by those skilled in the art that the difference in the total number of the V-shaped notches between the driven and the fixed members may be any amount desired. The larger the difference, assuming only a single pair of notches is aligned simultaneously, then the more exaggerated the incremental action is.

It will also be recognized that the fixed and driven members may each have an equal number of notches therein but with different angular spacing. Furthermore the angular spacing between notches (whether an equal or different number) may also vary with respect to each other on the same member. By such arrangements different types of movement desired for any particular application may be achieved.

When the positioning apparatus is circular as shown in FIGS. 1 and 2, it will be readily be recognized that continuous positioning through any number of revolutions is possible and the interconnection between the load and the movable member may be designed to take advantage of such positioning movement. However, the apparatus may be constructed in such a manner that as opposed to being circular it is only a part of a circle or is merely a curved configuration. Under these circumstances, a similar type of movement can be accomplished.

Figure 3:
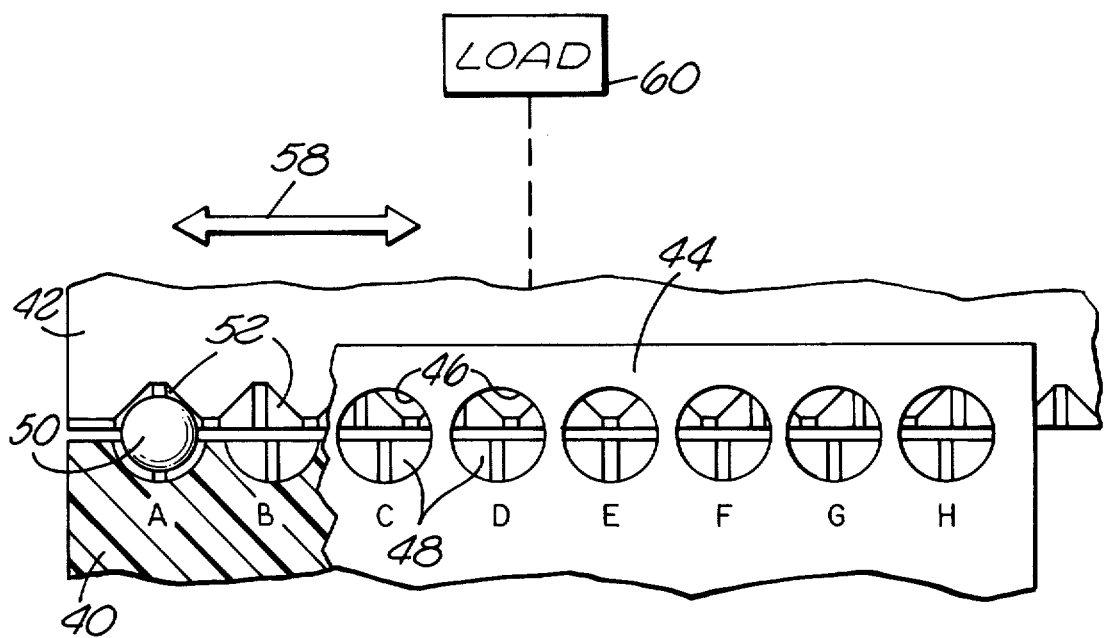
FIG. 3 is a schematic illustration, partly in cross section, of a different form of apparatus embodying the present invention.
Figure 4:
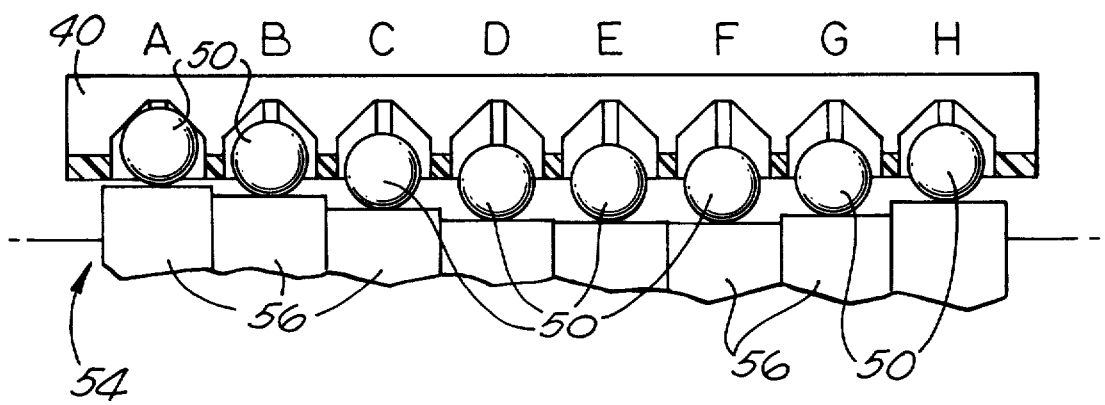
FIG. 4 is a view of the structure of FIG. 3 with a portion thereof removed for clarity of illustration.

In addition thereto, the configuration may be such that it is a straight line thus providing linear movement. Such a structure is illustrated in FIGS. 3 and 4 to which reference is hereby made. As is therein shown a fixed member or rack 40 has positioned adjacent thereto a movable member or rack 42. The fixed rack 40 includes a flange 44 extending thereover (a portion of which has been removed in FIG. 3), and which defines a plurality of openings 46 therein. The fixed rack 40 defines a plurality of V-shaped notches 48 within which there is received a like number of balls 50, only one of which is shown in FIG. 3. The moving rack 42 also defines a plurality of V-shaped notches 52. As can be seen in FIG. 3 there are a greater number of V-shaped notches 52 on the moving track 42 than there are V-shaped notches on the fixed track 40. An elongated shaft 54 is supported for rotation by any means desired. The shaft 54 defines a plurality of cam surfaces 56, each of which contacts one of the balls 50 as more clearly shown in FIG. 4. It will be recognized by those skilled in the art that as the shaft 54 rotates, each of the cam surfaces will cause the ball 50 associated therewith to oscillate between a seated position as shown at station A to a receded or unseated position as shown at station F. As such oscillation occurs the moving rack 42 is positioned linearly in either direction depending upon the rotation of the shaft 54 as is illustrated by the arrow 58. In addition, the load 60 connected to the moving rack 42 may then be positioned accordingly.

Figure 5:
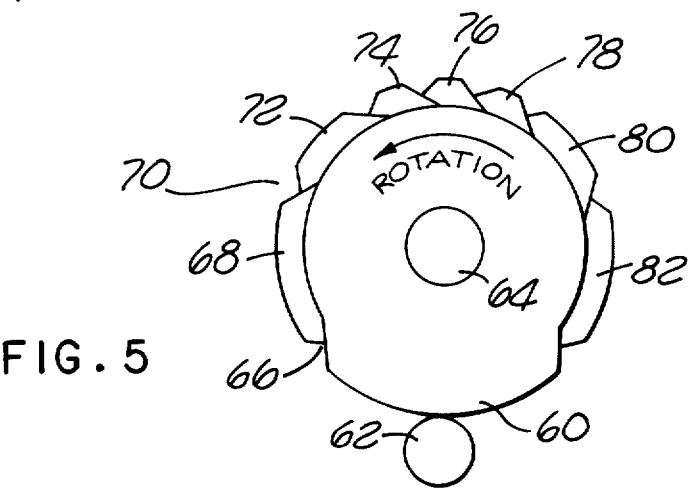
FIG. 5 is an end view of a cam structure which can be used in conjunction with apparatus embodying the present invention.

FIG. 5 illustrates in end view an alternate configuration of a straight cam more suitable for driving print head carriages on printing machines, or platen carriages on moving platen printing machines. In this class of machinery, short dwell periods of little or no motion are required while character printing is executed, followed by rapid acceleration and deceleration to position the machine elements at the next printing location. In this configuration, the cams are of unequal angular magnitude. One or more cams which act against the positioning balls during the printing operation are of substantial magnitude and in the illustration, cam 60 represents such a cam. The substantial angular magnitude of this cam provides a substantial dwell period of engagement of ball 62 although cam shaft 64 continues to rotate. Consequently, the positioner ceases its linear movement until transition point 66 is reached and cam 68 engages its adjacent ball, generating a linear accelerating force on the driven carriage. Cam 68 is of substantial angular magnitude to permit that accelerating force to act on the carriage for a substantial period of time. When transition point 70 is reached, cam 72 begins to act on its adjacent ball, causing another accelerating force to be applied to the carriage, but because the carriage is now moving, the period during which this force can be applied is much shorter, and therefore cam 72 is much smaller in angular magnitude. Cams 74, 76, and 78 are equal in angular magnitude, and generate a constant velocity motion in the carriage. Cam 80 is of slightly greater angular magnitude, and therefore during the last portion of its period of engagement, it exerts a decelerating force, slowing the carriage. Cam 82 is of still greater angular magnitude, and therefore, again exerts still more deceleration. Cam 60 again engages its adjacent ball, and again, complete cessation of linear motion is achieved. In this manner a flywheel can be incorporated on the rotating cam shaft 64, and kinetic energy can be alternately transferred from the flywheel to the carriage and back, permitting a reduction in input power over that required by conventional positioners. By altering the cam transition points, any carriage velocity profile can be generated, including any number of zero velocity periods, and any number of reverse velocity periods.

Those skilled in the art will recognize that various other configurations of positioning apparatus constructed in accordance with the present invention may be utilized. Configurations chosen may yield various types of travels and velocities, for example, unidirectional travel of constant velocity, unidirectional travel of variable velocity, oscillating travel of a fixed magnitude, directional reversal impressed upon an overall travel in one direction, or the like.

The various fixed and moving members may be constructed of any material desired, however, preferably they are constructed of molded fiberglass filled polycarbonate plastic. The balls utilized preferably are stainless steel while the cams may be constructed of various materials as known to those skilled in the art.

There has thus then been disclosed an incremental positioning apparatus which positively positions a movable member with respect to a fixed member without dead band or oscillation by using minimal power and inexpensively fabricated through the utilization of a plastic molding process.

What is claimed is:

1. Incremental positioning apparatus comprising:
   a first member having a first plurality of substantially V shaped force receiving surfaces of a first predetermined spacing;
   a second member disposed adjacent said first member and having a second plurality of substantially V shaped force receiving surfaces of a second predetermined spacing, said second predetermined spacing being different from said first predetermined spacing;
   a driving means disposed adjacent said first and second member;
   means for moving said driving means into simultaneous engagement with said first and second V shaped surfaces for aligning at least one of said second V shaped surfaces with one of said first V shaped surfaces to intermittently move a load connected to one of said members to a desired position.

2. Positioning apparatus as defined in claim 1 wherein said driving means includes a separate driving member for each of said surfaces on said first member.

3. Positioning apparatus as defined in claim 2 wherein each of said driving members defines a curved surface and said force receiving surfaces on said first and second members are depressions defined by angular walls.

4. Positioning apparatus as defined in claim 3 wherein said driving members are balls.

5. Positioning apparatus as defined in claim 4 wherein said walls define flat surfaces.

6. Positioning apparatus as defined in claim 2 wherein said means for moving said driving members is a cam.

7. Positioning apparatus as defined in claim 6 wherein said cam has at least a single lobe for actuating one of said driving members at a time.

8. Positioning apparatus as defined in claim 6 wherein said cam has a plurality of lobes only one of which actuates a driving member at any one time to align one of said V shaped surfaces on said first member with one of said V shaped surfaces on said second member.

9. Positioning apparatus as defined in claim 6 wherein said cam has a plurality of lobes at least two of which, at any one time, actuate a driving member to simultaneously align two of said V shaped surfaces on said first member with two of said V shaped surfaces on said second member.

10. Positioning apparatus as defined in claim 7 wherein said cam is arcuate.

11. Positioning apparatus as defined in claim 7 wherein said cam is an elongated shaft.

12. Positioning apparatus as defined in claim 8 wherein said cam is an elongated shaft.

13. Positioning apparatus as defined in claim 2 which further includes means for retaining said driving member aligned with said V shaped surfaces on said first member.

14. Positioning apparatus as defined in claim 13 wherein said driving members are balls and said V shaped surfaces are flat walled recesses and said retaining means is a plate defining openings therein receiving said balls, said openings being aligned with the V shaped recesses in said first member.

15. Positioning apparatus as defined in claim 1 wherein said second predetermined spacing is greater than said first predetermined spacing.

16. Positioning apparatus as defined in claim 1 wherein said second predetermined spacing is less than said first predetermined spacing.

* * * * *